July 23, 1929.  V. GLUCKSTEIN  1,721,777
CRANE
Filed June 18, 1928   2 Sheets-Sheet 2

Inventor
V. Gluckstein

Patented July 23, 1929.

1,721,777

UNITED STATES PATENT OFFICE.

VINCENT GLUCKSTEIN, OF LONDON, ENGLAND.

CRANE.

Application filed June 18, 1928, Serial No. 286,234, and in Great Britain March 22, 1928.

This invention relates to improvements in cranes.

Cranes as hitherto constructed have comprised jib and tail rods fixed to a centre or "king" post which post is either adapted to be rotated about its own axis for carrying round the loads on the crane, or is mounted on a rotatable platform, or is fixed and stayed so that the load could only rotate about a part of a circle. Such cranes cannot be easily and quickly erected and dismounted.

The object of the present invention is to construct a crane which can be easily and quickly erected and dismounted, can be used wherever a vertical stanchion or beam is available for use therewith, and whereby the load can be carried round through a complete circle.

In carrying out my invention according to one construction, I enclose the vertical stanchion or beam between the two halves of a split sleeve suitably wedged to hold it rigid with the stanchion or beam.

At the lower end of the split sleeve I secure a circular flanged collar providing two races, one horizontal and one vertical, the horizontal race to take the vertical load and the vertical race to take the horizontal thrust of the jib. Between the rear ends of the jib arms is mounted a bracket carrying the axles of rollers rotating on the horizontal race. The bracket also carries rollers which rotate on the vertical race. The platform for the operator extends from the jib and may surround the split sleeve.

At the upper end of the split sleeve I secure another collar providing a vertical race to take the horizontal thrust of the tail rod of the crane, horizontal rollers being mounted on a cross bar connecting the two arms of the tail rod.

The method wedging which I adopt is as follows:—

To the inside of each half-sleeve I secure two blocks in such a manner that, when the sleeve is in position, the axes of the blocks are at right angles to each other. Each block has two horizontal holes, in each of which is mounted a screw-threaded bolt with a T-shaped head. On the T-shaped bolt heads of each block is loosely mounted a vertical plate and between the said plate and the block are two nuts on each bolt. Rotation of the nuts causes the bolts to travel in or out of the holes in the blocks, moving the plate backwards or forwards, thus wedging the sleeve to, or releasing it from, the vertical stanchion. If desired suitable packing may be placed between the plate and the stanchion.

In other forms of construction the sleeve is either made in skeleton form or is dispensed with entirely, the wedging means being then secured to the inside of the collars.

My invention is illustrated in the accompanying drawings, wherein:—

Figure 1:
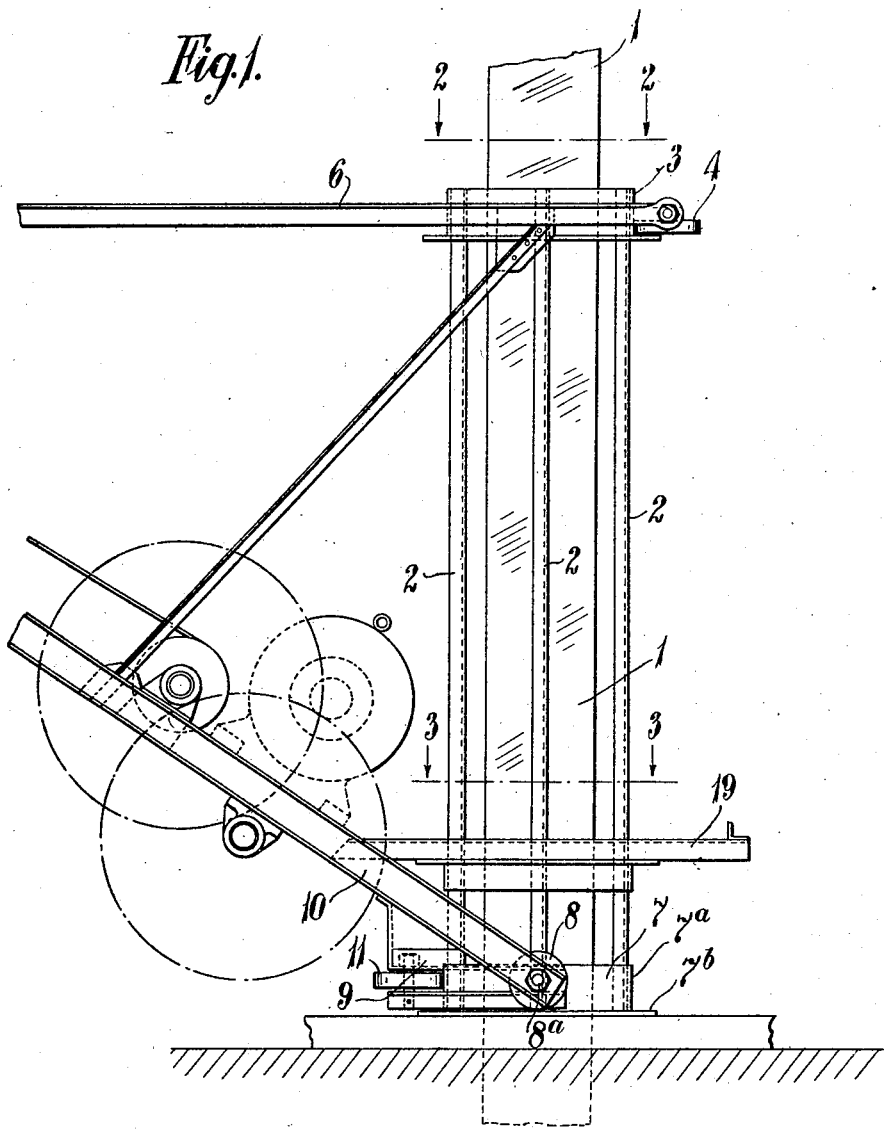
Figure 2:
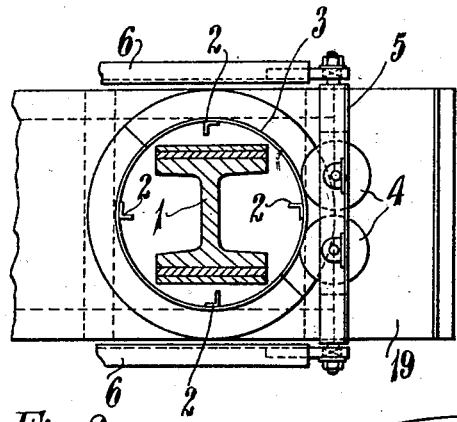
Figure 3:
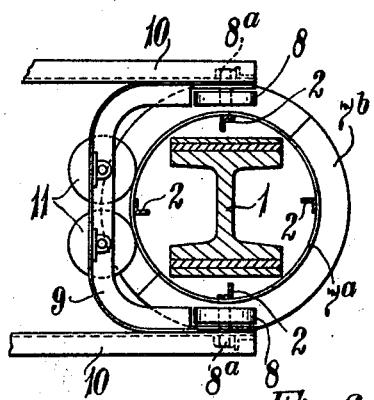
Figure 4:
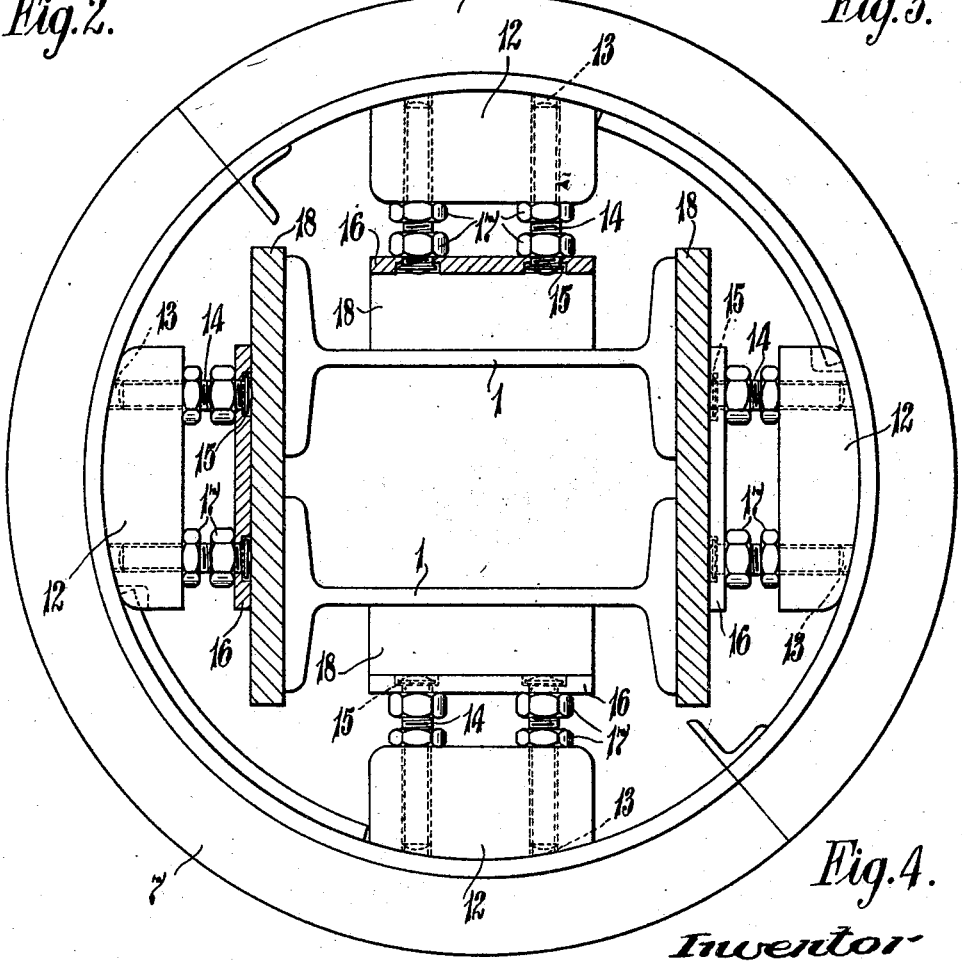

Fig. 1 illustrates a crane, partly broken away, made in accordance with my invention;

Figs. 2 and 3 are plan sections taken on the line 2—2 and 3—3 respectively of Fig. 1; and Fig. 4 is a part sectional view on an enlarged scale, showing my improved method of securing the parts in position on the fixed vertical stanchion.

Similar numerals are used to indicate like or similar parts in all the figures of the drawings.

In these drawings 1 represents a vertical stanchion or beam to which my improved crane is fitted and 2 represents the skeleton sleeve surrounding the stanchion or beam 1. To the upper end of the sleeve 2 is secured a collar providing a vertical race 3 on which rotate the rollers 4 rotatably mounted on a cross bar 5 joining the two rear ends of the tail rod 6 of the crane.

To the lower end of the sleeve 2 I secure a flanged collar 7 which forms two races, a vertical race $7^a$ and a horizontal race $7^b$. On the horizontal race $7^b$ rotate the two rollers 8 mounted in the arms of a channel-shaped bracket 9 so that they are on diametrically opposite sides of the race $7^b$. The axles $8^a$ of the rollers 8 extend through the bracket 9 and on their ends are mounted the rear ends 10 of the jib.

Mounted in the bracket 9, with their axes at right angles to the axes of the rollers 8, are two additional rollers 11 which rotate on the vertical race 7ª.

It is obvious that instead of having a split sleeve surrounding the vertical stanchion or beam, I can simply secure the collars direct to the top and bottom of said stanchion or beam.

In Fig. 4 is illustrated the method of securing one of the collars, say the bottom collar, in position on to the stanchion shown as two parallel vertical H-shaped girders 1. The collar is made in two parts, the parts being secured together by bolts and lugs on the inside of the collar, but this securing means has been omitted for the sake of clearness.

To the inside of each half collar 7 I secure two blocks 12 with their axes at right angles to each other. Each block 12 has two horizontal holes 13 in each of which is mounted a screw-threaded bolt 14 with a T-shaped head 15. On the two heads 15 of the bolts 14 of each block is loosely mounted a plate 16, and between the plate 16 and the block 12 each bolt 14 is provided with two nuts 17. Blocks of suitable packing material are shown at 18.

It will be obvious that by screwing the nuts 17 in one direction or the other the plates 16 will be moved to or away from the vertical girders 1 and thus firmly secure the collar 7 to, or release it from, said girders.

Any suitable method for rotating the crane around the stanchion may be employed, an electric motor being shown diagrammatically in Fig. 1, and a platform such as is shown at 19 in Fig. 1 is provided for the operator.

I claim:—

1. A crane comprising in combination a fixed vertical stanchion, a jib provided with two sets of rollers rotating in planes at right angles on its inner end, a tail rod provided with rollers on its inner end, two split circular collars, secured to the said fixed vertical stanchion, the lower of said split circular collars having a right angle flange, said jib and tail rod being mounted on said split circular collars so as to allow of their complete rotation.

2. A crane comprising in combination a fixed vertical stanchion, a jib provided with rollers on its inner end, a tail rod provided with rollers on its inner end, two split circular collars, blocks mounted on the inside of the collars, each block having mounted therein T-headed, screw-threaded bolts adapted to be rotated by means of nuts mounted on the bolts, said jib and tail rod being mounted on said split circular collars so as to allow of their complete rotation.

3. A crane comprising in combination a fixed vertical stanchion, a jib provided with rollers on its inner end, a tail rod provided with rollers on its inner end, two split circular collars, four blocks mounted on the inside of the collars, each block having mounted therein two T-headed, screw-threaded bolts carrying a plate and adapted to be rotated by means of nuts mounted on the bolts between the said plate and the block, said jib and tail rod being mounted on said split circular collars so as to allow of their complete rotation.

4. A crane comprising in combination a fixed vertical stanchion, a jib provided with rollers on its inner end, a tail rod provided with rollers on its inner end, two split circular collars, four blocks mounted on the inside of the collars, each block having mounted therein two T-headed, screw-threaded bolts carrying a plate and adapted to be rotated by means of nuts mounted on the bolts between the said plate and the block, the lower of said split circular collars having a right angle flange, said jib and tail rod being mounted on said split circular collars so as to allow of their complete rotation.

5. A crane comprising in combination a fixed vertical stanchion, a jib provided with two sets of rollers rotating in planes at right angles on its inner end, a tail rod provided with rollers on its inner end, two split circular collars, four blocks mounted on the inside of the collars, each block having mounted therein two T-headed, screw-threaded bolts carrying a plate and adapted to be rotated by means of nuts mounted on the bolts between the said plate and the block, the lower of said circular collars having a right angle flange, said jib and tail rod being mounted on said split circular collars so as to allow of their complete rotation.

6. A crane including spaced sectional collars, skeleton means connecting the collars, means whereby the collars may be held in fixed relation to any fixture of appropriate cross section, a tail rod having a roller bearing support on one of said collars, and a jib having a double roller bearing support on the other of said collars, the respective rollers of the jib support acting in planes at right angles to each other.

7. A crane including spaced sectional collars, skeleton means connecting the collars, means whereby the collars may be held in fixed relation to any fixture of appropriate cross section, a tail rod having a roller bearing support on one of said collars, and a jib having a double roller bearing support on the other of said collars, the respective rollers of the jib support acting in planes at right angles to each other, the support of the tail rod and jib permitting complete rotation of the parts about the collars as a center.

8. A crane including spaced sectional collars, means whereby the collars may be held in fixed relation to any fixture of appropriate cross section, a tail rod having a roller bearing support on one of said collars, and a jib having a double roller bearing support on the other of said collars, the respective rollers of the jib support acting in planes at right angles to each other.

9. A crane including spaced sectional collars, means whereby the collars may be held in fixed relation to any fixture of appropriate cross section, a tail rod having a roller bearing support on one of said collars, and a jib having a double roller bearing support on the other of said collars, the respective rollers of the jib support acting in planes at right angles to each other, the support of the tail rod and jib permitting complete rotation of the parts about the collars as a center.

In testimony whereof I have hereunto set my hand this 4th day of June, 1928.

VINCENT GLUCKSTEIN.